(12) United States Patent
Trattler (10) Patent No.: US 9,179,520 B2
(45) Date of Patent: Nov. 3, 2015

(54) METHOD FOR CURRENT LIMITATION OF A LOAD CURRENT AND CIRCUIT HAVING CURRENT LIMITATION OF A LOAD CURRENT FOR A FLASH MEANS

(75) Inventor: Peter Trattler, Graz (AT)

(73) Assignee: ams AG, Unterpremstaetten (AT)

( * ) Notice: Subject to any disclaimer, the term of this patent is extended or adjusted under 35 U.S.C. 154(b) by 292 days.

(21) Appl. No.: 13/876,836

(22) PCT Filed: Sep. 29, 2011

(86) PCT No.: PCT/EP2011/067035
§ 371 (c)(1),
(2), (4) Date: Jun. 5, 2013

(87) PCT Pub. No.: WO2012/041985
PCT Pub. Date: Apr. 5, 2012

(65) Prior Publication Data
US 2013/0241442 A1    Sep. 19, 2013

(30) Foreign Application Priority Data

Sep. 30, 2010   (DE) .......................... 10 2010 047 157

(51) Int. Cl.
*H05B 37/02*   (2006.01)
*G03B 7/26*   (2006.01)
*G03B 15/05*   (2006.01)
*H05B 33/08*   (2006.01)

(52) U.S. Cl.
CPC  *H05B 37/02* (2013.01); *G03B 7/26* (2013.01); *G03B 15/05* (2013.01); *H05B 33/0806* (2013.01)

(58) Field of Classification Search
CPC ...... G03B 7/26; G03B 15/05; H05B 33/0806; H05B 33/0815; H05B 37/02; H05B 41/28; H05B 41/3927

USPC .......................................................... 315/307
See application file for complete search history.

(56) References Cited

U.S. PATENT DOCUMENTS

| 2003/0076051 | A1 | 4/2003 | Bowman et al. |
| 2004/0247305 | A1 | 12/2004 | Lee et al. |
| 2007/0147822 | A1 | 6/2007 | Tanaka |
| 2009/0085502 | A1 | 4/2009 | Geris et al. |
| 2009/0121644 | A1 | 5/2009 | Sandner et al. |
| 2010/0213842 | A1* | 8/2010 | Geris ............................... 315/33 |

FOREIGN PATENT DOCUMENTS

| DE | 102005030123 A1 | 1/2007 |
| DE | 102007054253 B3 | 7/2009 |
| WO | 2009/035953 A1 | 3/2009 |

* cited by examiner

*Primary Examiner* — Lincoln Donovan
*Assistant Examiner* — David Mattison
(74) *Attorney, Agent, or Firm* — McDermott Will & Emery LLP (57) ABSTRACT

The invention relates to a method for the current limitation of a load current, in particular the load current of a flash means. In one step, first a supply voltage (VBAT) is provided. Then a load current (I) is set depending on the supply voltage (VBAT) for supplying the flash means (LED) with power by incrementally reducing the load current (I) until the supply voltage (VBAT) is greater than a threshold value (Vlow). The load current intensity (Imin) of the set load current (I) can be stored in a register (RAM) for the subsequent triggering of the flash means (LED) in a main flash phase (2) with the load current intensity (Imin) stored in the register (RAM). In addition, the invention relates to a circuit having current limitation of a load current of a flash means.

17 Claims, 3 Drawing Sheets

METHOD FOR CURRENT LIMITATION OF A LOAD CURRENT AND CIRCUIT HAVING CURRENT LIMITATION OF A LOAD CURRENT FOR A FLASH MEANS

The invention relates to a method for current limitation of a load current for a flash means. The invention further relates to a circuit having current limitation of a load current for a flash means.

Mobile terminal devices such as cell phones, smart phones and PDAs (personal digital assistants) are generally operated with batteries or storage batteries. Depending on the charge state of the one-way or rechargeable battery, a supply voltage supplies a plurality of subsystems of the device such as the communication unit with the reception unit, the graphic display and various network processes. But particularly for mobile terminal devices there are usually also systems that can be operated even with a reduced power or battery voltage. For example, many devices have a camera function. The devices are often equipped with flash units based a xenon or LED lighting means for use with the generally integrated camera under different lighting conditions. Flash devices based on LEDs in particular generally require a high charging or load current, which must also be provided within a brief time. For this reason, the supply voltage can fall temporarily, or if the charge state is already low, it can fall below a critical threshold voltage. This can in turn lead to switching off or resetting subsystems, which in the extreme case can even lead to a shutdown of the entire system.

Flash devices on mobile terminal devices can be operated with a reduced power to a certain extent. In order to do this, the charging or load current of the flash devices is dynamically adjusted and thus adapted to the charge state of the one-way or rechargeable battery. In particular, this takes into account the loads or subsystems that are currently connected. It is precisely this measure, however, which harbors a certain difficulty, because the required charge current can generally not be predicted. For example, certain loads may have been added or switched off during the operation of the flash. In particular, an incoming call or text message is both unpredictable and has a large effect on the usable supply voltage. The maximum possible charging current also depends on the equivalent series resistance of the one-way or rechargeable battery, known as ESR. This can only be determined with difficulty while operation is ongoing and thus it contributes to the uncertainty of estimating the charging current available. In particular, the ESR is very dependent on the temperature.

The problem of the present invention is therefore to provide a method for current limitation of a load current, and to provide a circuit with current limitation of a load current that enable a more reliable predictability of the load current.

The problem is solved with the independent claims. Refinements and configurations are the subject matter of the dependent claims.

In one embodiment of the method for current limitation of a load current, in particular the load current for a flash means, a supply voltage is first provided. A load current for the power supply of the flash means is initially adjusted based on the supply voltage. The load current is reduced stepwise until the supply voltage is greater than a threshold value.

The method presented allows an advantageous current limitation of the load current. In particular, the load current has high predictability. This becomes possible because the load current is reduced incrementally based on the supply voltage. The level of the supply voltage is determined in particular by the presence of certain loads which must be operated together with a circuit for operating the flash means, for example.

In this manner, the load current additionally becomes independent of the battery condition to a large extent. In particular, it is no longer necessary to determine the internal resistance or ESR of the battery, which depends primarily on the temperature. The threshold value can also allow for maintaining sufficient reserves of the supply voltage present so as to prevent switching off of subsystems or even the entire system.

In another embodiment, the load current is adjusted in a pre-flash phase.

The available load current intensity is reliably determined during the pre-flash phase. If certain loads are switched off during further operation and therefore the supply voltage again rises above the threshold value, the load current is nevertheless not increased, but instead remains at the adjusted load current intensity. In this way a minimum load current intensity is set, which still remains adjustable by means of the method even with simultaneous operation of different loads.

In another embodiment, the load current intensity is stored in a register when the load current is adjusted and is retrieved for subsequent triggering of the flash means. The flash means is triggered in a temporally successive main flash phase at the load current intensity level stored in the register. The load current intensity for the main flash phase is determined in the pre-flash phase.

Thus the flash means can be operated in the main flash phase with the stored current intensity, which is reliably available.

In one embodiment, the load current increases before the beginning of the pre-flash phase. The load current is increased in a ramp form before beginning of the pre-flash phase. The load current has a rising edge before the beginning of pre-flash phase. The load current is run up in a ramp form. The load current can be increased from a value of 0, for example. The increase can be stepwise, for example. Apart from the steps, the increase can be linear. While the load current is being increased before the beginning of the pre-flash phase, there is a detection of whether the supply voltage is greater than the threshold value. If the supply voltage is less than or equal to a threshold value for a given value of the load current, then the run-up phase is ended and the load current is reduced stepwise.

In another embodiment, the load current is adjusted before or at the beginning of the pre-flash phase to a starting current intensity. The starting current intensity is either a previously determined maximum current intensity or corresponds to a current intensity at which the supply voltage is still greater than the threshold value. Beginning from the starting current intensity that has been set, the load current is then reduced stepwise in the pre-flash phase.

In a preferred embodiment, the supply voltage is greater than the threshold value at the previously determined maximum current intensity. In this case, the load current is not reduced in the starting phase before the beginning of the pre-flash phase. The starting phase includes the run-up phase. A reduction of the load current may be required, however, during the pre-flash phase due to connection of a load.

Given sufficient battery charge conditions, a starting current intensity can be set that corresponds to the previously determined maximum value, namely the maximum current intensity. If the charge state of the battery is already at a low value, however, then it may no longer be possible to achieve the previously determined maximum current intensity in the operation of the flash means. For this reason, it is advantageous if the load current is then adjusted to a current intensity that does not place an unnecessary burden on the supply voltage. At this current intensity, which arises before, during or shortly after the beginning of the pre-flash phase, the supply voltage is just larger than the threshold value. Running up the load current in the starting phase is thus stopped and the load current is reduced stepwise to the starting current intensity, at which the supply voltage is again greater than the threshold value.

In another embodiment, the flash means is triggered with this set starting current intensity when the pre-flash phase begins.

During the pre-flash phase, which is used, for example, for red-eye correction, autofocusing or other imaging applications, the minimum current intensity available is determined. Beginning from the adjusted starting current intensity, the current intensity is preferably reduced by connecting additional loads to the minimum available and reliably adjustable current intensity.

In another embodiment, at least one additional load is connected stepwise to the supply voltage in the pre-flash phase. The load current is then reduced based on the connected load.

The at least one additional load may represent an additional subprocess that is implemented in the terminal device. This may be a camera processor or an image sensor, for example, that is operated simultaneously with the flash means. By connecting additional loads, it is possible to reliably estimate the minimum load current intensity available in the system. Thus, for example, all necessary systems or loads can be connected in the pre-flash phase and their power consumption can be estimated. In the main flash phase, the loads used in the pre-flash phase are preferably operated and other loads are excluded.

In another embodiment, a gain of a connectible sensor is adjusted as a function of the load current intensity stored in the register. The sensor can be configured as an image sensor or a camera.

If the stored load current intensity is available to the flash means during the pre-flash and main flash phases, this is generally not sufficient for taking a picture. In order to achieve a good illumination of a subject, the gain is then preferably adjusted by means of a suitable amplifier at the image sensor. This may be done by means of an image processor. The available load current intensity and how it contributes to illuminating the subject is taken into account in this process. The gain then takes into account any remaining differences such as those in the brightness achievable with the flash means.

In one embodiment, an exposure time of the connectible sensor is adjusted as a function of the load current intensity stored in the register.

In another embodiment, the stepwise reduction of the load current for operating the priority load is interrupted based on a control signal for a time period of the control signal.

It may be possible that loads must be operated with a preset priority during both the pre-flash phase and the main flash phase. This can become necessary due to an incoming call or text message. These applications or priority loads have priority over taking a picture. In order to prevent the system from undergoing a power consumption, due to an incoming call for example, that would unnecessarily burden the supply voltage and lead under certain circumstances to a shutdown of subsystems or the entire system, the pre-flash phase of the main flash phase is interrupted for the time period by means of a control signal. The time period preferably corresponds to the time in which the control signal is present.

In this manner it is advantageously possible to continue to select the minimum load current intensity reliably and to prevent temporary shutdown of subsystems or the entire system.

In another embodiment, an interim current intensity is initially stored based on the control signal. After expiration of the time period for the control signal, the interim current intensity is readjusted and the reduction of the load current is continued, starting from the stored interim current intensity.

According to another embodiment, the flash means is triggered in the main flash phase. The flash means is operated at the current intensity stored in the register, which remains constant during the main flash phase. However, the control signal can also indicate in the main flash phase that a priority load is to be operated and therefore interrupt the main flash phase.

In one embodiment, the load current is increased in a ramp-like manner before the start of the main flash phase.

In one embodiment of a circuit for current limitation of a load current, in particular the load current for a flash means, the circuit comprises a controllable power supply to which a supply voltage can be connected. The circuit further comprises a comparison means to which the supply voltage can be supplied and which provides a comparison voltage. A control unit is connected to the comparison means and the controllable power supply. A register is also coupled to the control unit.

The controllable power supply provides a load current for the connectible load. The load current for supplying the connectible flash means is provided based on the supply voltage. The supply voltage is fed for this purpose to the comparison means and a threshold value is applied to the comparison means. The control unit is designed to reduce the load current by means of the controllable power supply as a function of the comparison voltage. The register stores a minimum load current intensity. This load current intensity has a value at which the flash means can still be operated when various connectible loads are connected to the circuit.

The circuit presented makes it possible to operate the flash means with a reliably adjustable load current. The current is adjusted in such a manner that the supply voltage is above the threshold value. In particular, the load current therefore has a high degree of predictability. The level of the supply voltage depends on the additional loads which are to be operated together with the circuit. During a pre-flash phase, the load current intensity that is reliably available is determined. If certain loads are switched off during further operation and therefore the supply voltage again rises above the threshold value, the load current is nevertheless not increased, but instead remains at the adjusted load current intensity. In this way a minimum load current intensity is set, which still remains adjustable even with simultaneous operation of different loads.

In this manner, the load current additionally becomes independent of the battery condition to a large extent. In particular, it is no longer necessary to determine the internal resistance or ESR of the battery, which depends primarily on the temperature. The threshold value can also allow for maintaining sufficient reserves of the supply voltage present so as to prevent switching off of subsystems or even the entire system.

In one embodiment, the control unit is designed to reduce the load current by means of the controllable power supply stepwise as a function of the comparison voltage. A step in the stepwise reduction of the load current can have a predetermined value. The number of steps can be greater than one.

In another embodiment, the comparison means is implemented as a comparator.

In another embodiment, the controllable power supply is implemented as a current source or a current sink. The controllable power supply is realized as a controlled power supply and has an internal control loop.

In another embodiment, the control unit can be combined with a processor.

The processor is designed to adjust a gain of a sensor connected to the processor based on the load current intensity stored in the register. Alternatively, the register can be implemented in the control unit or in the processor. In this manner, a user of the circuit can decide whether the circuit is to be implemented autonomously, as an integrated circuit for example. With the aid of the processor and an external register, however, the user has the freedom to select individual programming.

According to another embodiment, the control unit is designed to control the power source based on a control signal in order to operate a priority load. A control signal is preferably coupled with the priority load by means of a data line for this purpose.

The control signal indicates to the control unit that a priority load is to be operated. This can become necessary due to an incoming call or text message, because an RF amplifier must be switched on for that purpose. Consequently a load current necessary for the priority load is provided based on the available supply voltage. The pre-flash phase is interrupted for the duration of the control signal.

According to another embodiment, the control unit stores and loads an interim current intensity into the register.

If the pre-flash phase is interrupted for a time period by means of the control signal, it is advantageous to store the load current intensity adjusted at this point in time as an interim load current intensity at the beginning of the control signal. After the priority load is switched off or after the end of the control signal, the interim current intensity can be recalled and readjusted.

According to another embodiment, the circuit has a voltage converter. The voltage converter couples the controllable power supply with the connectible supply voltage and is connected to the comparison means.

The invention will be described below for several embodiment examples with reference to the figures. Insofar as parts or components correspond to one another in function, a description of them will not be repeated in each of the following figures.

Therein.

Figure 1:
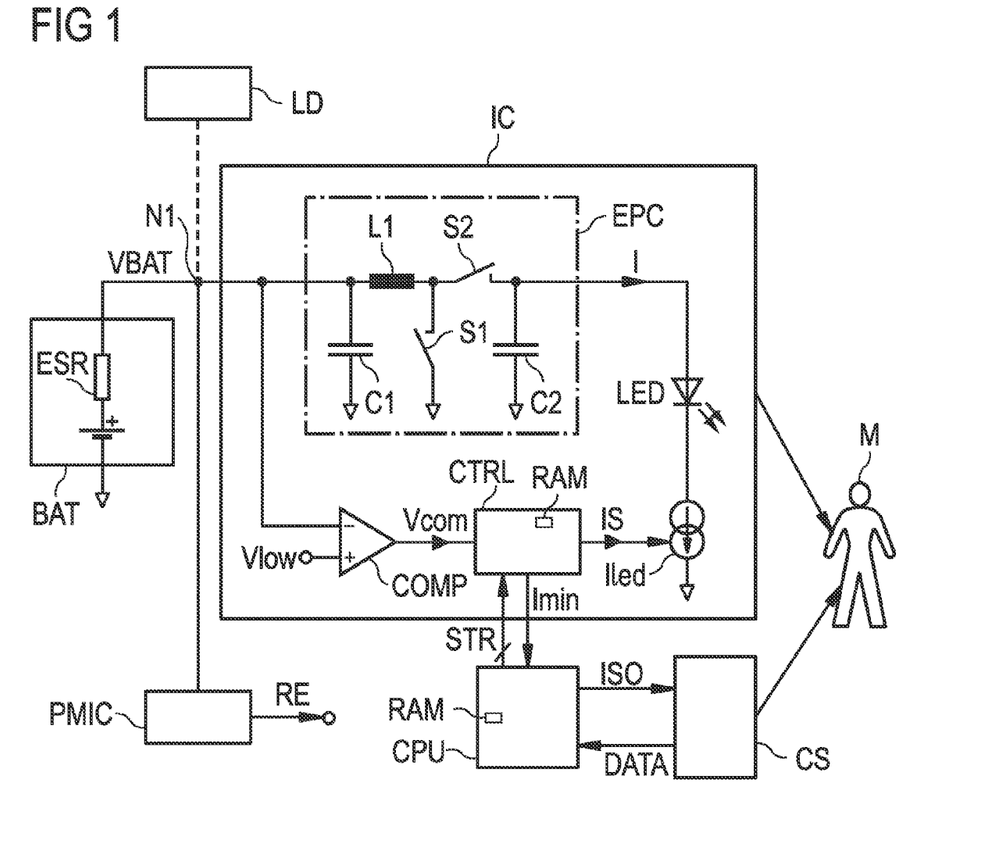
FIG. 1 shows an example of a circuit with current limitation of a load current according to the proposed principle.

FIG. 1 shows an embodiment example of a circuit with current limitation according to the proposed principle. An integrated circuit IC is connected to a voltage converter EPC, which supplies a load current I to a flash means LED. The voltage converter EPC is designed as a synchronous converter and comprises an inductor L1, a first and second switch S1, S2 and first and second capacitors C1, C2. The voltage converter EPC is connected firstly to a node N1 and secondly to the flash means LED. The voltage converter EPC can alternatively also be configured as a charge pump or as a DC-DC converter. An implementation of the circuit that does not require a voltage converter is also conceivable. In principle, any component that allows a supply of power to the flash means LED can be used.

The flash means LED is in turn connected to ground by means of a controllable power supply Iled with reduced current intensity. The controllable power supply Iled can be realized as a current source. Alternatively, the use of a current sink controllable in the same manner is likewise conceivable. The flash means LED is preferably a light emitting diode or another lighting means that is suitable for lighting a subject M for the taking of a picture. One output of the voltage converter EPC is connected to ground via a series circuit comprising the controllable power supply Iled and the flash means LED. The controllable power supply Iled is controlled by a control unit CTRL. For this purpose, a first input of a comparison means COMP is connected to the node N1 and thus to a supply voltage VBAT. A second input of the comparison means COMP is at a threshold voltage Vlow. An output of the comparison means COMP is connected to the control unit CTRL and provides a comparison voltage Vcom. The comparison means COMP can be implemented as a comparing means.

The control unit CTRL is coupled by means of a control line to the processor CPU, which in turn operates a sensor CS, hereinafter also referred to as an image sensor. The sensor CS can be produced by means of a complementary metal oxide semiconductor technology, abbreviated CMOS. Corresponding data lines are provided for exchanging data between the processor CPU and the image sensor CS. They are indicated in FIG. 1 in the form of a control line for transmitting a gain level ISO, and a data line DATA for transmitting image information. The image sensor CS is used for receiving image information values from the subject M. The processor CPU is coupled via a control line STR to the control unit CTRL. An exposure time TB can also be set by the processor CPU via the control line STR. The processor CPU can also provide information relating to a current level such as a maximum current intensity Imax to the control unit CTRL via the control line STR.

Additional loads and units can be connected to the integrated circuit IC by means of the node N1. These may include additional loads LD, a battery BAT with equivalent resistance ESR and a circuit for controlling the power supply of the integrated circuit IC, also referred to as a PMIC: Power Management IC. The battery BAT outputs the supply voltage VBAT, which can also be referred to as the battery voltage. The power management circuit PMIC receives the supply voltage VBAT and outputs a reset signal RE. The power management circuit PMIC determines the reset signal RE as a function of a comparison between the supply voltage VBAT and a specified value. Additional loads LD comprise, for example, subprocesses of a mobile terminal device that require an additional supply voltage VBAT for operation. These can be, for example, telecommunication electronics such as receivers and network interfaces that place a load on the battery voltage VBAT when there are incoming or outgoing calls.

A register RAM is also shown in FIG. 1. The register RAM is designed to store, by means of the control device CTRL, the current intensities Imin, Iint set at the controllable power supply. It is alternatively possible for the register RAM to be an element of the control unit CTRL or the processor CPU. Both cases are drawn in FIG. 1. It can also be advantageous, however, to provide the register RAM both in the control unit CTRL and in the processor CPU. In each case, the control unit CTRL is designed to write current intensities into the register RAM and recall them therefrom. The register RAM can be realized as a random access memory, abbreviated RAM.

The operation of the circuit and of the integrated circuits in particular will be explained in detail with reference to FIG. 2. In principle, the comparison means COMP monitors the battery voltage VBAT at its first input, with a threshold value Vlow at its second input. Based on a comparison, the comparison means COMP provides a comparison voltage Vcom at its output. The control unit CTRL processes the comparison voltage Vcom. The control output of the control circuit CTRL is connected to a control input of the controllable power supply Iled. The controllable power supply Iled adjusts the load current I according to a current signal IS output at the control output of the control unit CTRL. In a startup phase 11, the control unit CTRL controls the controllable power supply Iled in such a manner that the load current I rises. The startup phase 11 can be referred to as a run-up phase. The control unit CTRL comprises a digital circuit. The control unit CTRL controls the controllable power supply Iled in such a manner that the adjusted current intensity of the load current I is reduced until the battery voltage VBAT exceeds the threshold value Vlow. The corresponding current intensity of the load current I is always only reduced by the control unit CTRL. If a load LD is switched off and the voltage VBAT rises again, the current intensity of the load current I at the power supply Iled is not readjusted to a higher value.

The circuit according to FIG. 1 will preferably be used in mobile terminal devices such as cell phones, smart phones, personal digital assistants, also known as PDAs, mp3 players or similar devices with built-in cameras. Different processes or subprocesses run in parallel with one another in these devices. A load LD stressing the battery voltage VBAT can be assigned to a subprocess. The operation of the internal camera or the image sensor CS represents a subprocess in this sense.

Figure 2:
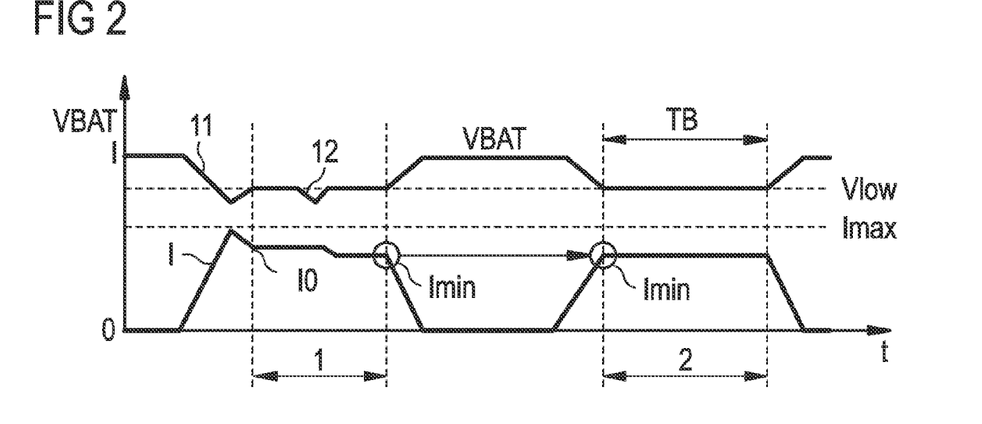
FIG. 2 shows an example of a method for current limitation of a load current according to the proposed principle.

FIG. 2 shows a method for current limitation according to the proposed principle. The battery voltage VBAT or the load current I is plotted against the time t. At the beginning of the method, the battery voltage VBAT is initially available at a value that may depend under certain conditions on the charge state of the battery BAT and the temperature. This value initially lies above the threshold value Vlow in the graphic of FIG. 2. In the starting phase 11, the load current I is set to a predetermined maximum current, namely the maximum current intensity Imax, or to a maximum current value that is still possible with the available voltage VBAT. The load current I is adjusted by a ramp-like run-up. The run-up can have stages or steps not shown in FIG. 2. The starting phase 11 is prior to a pre-flash phase 1. The starting phase 11 ends with the beginning of the pre-flash phase 1. The possible adjustable current value is determined by whether the battery voltage VBAT can still be adjusted above the threshold value Vlow. The flash means LED is ready for operation once a starting current intensity I0, i.e. the possible adjustable current value, has been reached.

Even during the rise, the comparison means COMP compares the supply voltage VBAT to the threshold value Vlow. The control unit CTRL stops the rise of the load current I if the supply voltage VBAT is less than or equal to the threshold value Vlow. The control unit CTRL then reduces the load current I stepwise, until the supply voltage VBAT is greater than the threshold value Vlow. The method during the rise of the load current high comprises the comparison of the supply voltage VBAT to the threshold value Vlow and the continuation of the rise of the load current I if the supply voltage VBAT is greater than the threshold value Vlow, or the stepwise reduction of the load current I if the supply voltage VBAT is less than or equal to the threshold value Vlow. Thus a voltage collapse of the supply voltage VBAT, which could lead to a shutdown or resetting of the integrated circuit IC, is avoided. The starting current intensity I0 is thus determined in the starting phase 11.

In the subsequent pre-flash phase 1, the maximum adjusted load current I is again reduced starting from the current intensity I0. For that purpose, the flash means LED is triggered with the adjusted starting current intensity I0. The stipulation during the pre-flash phase 1 is to keep the battery voltage VBAT always above the threshold value Vlow even if additional loads LD are switched on. Thus it may be necessary, as shown in FIG. 2, to take back the load current I when an additional load LD is switched on at a time 12, in order to keep the battery voltage VBAT above the threshold value Vlow. The starting current intensity I0 is reduced to a load current intensity Imin. Such a successive adjustment of the load current intensity Imin takes place stepwise by switching on all loads LD required or used in parallel by a user until the minimum load current intensity Imin has been adjusted, which ensures that the battery voltage VBAT remains above the threshold value Vlow. This minimum load current intensity Imin is stored in the register RAM and is available for additional process steps such as the main flash phase 2.

Temporally following the pre-flash phase 1, adjustment of the gain ISO of the image sensor CS is undertaken based on the stored minimum load current intensity Imin. For this purpose, the processor CPU is induced to undertake an ISO or gain adjustment in such a manner that the image sensor CS can record the subject M with the minimum load current intensity Imin. If this setting has been made, then this phase is followed by the main flash phase 2. In the period between the pre-flash phase 1 and the main flash phase 2, the load current I has again been reduced to the value 0. The control unit CTRL or the processor CPU uses the value of the load current intensity Imin stored in the register RAM to adjust the value of the load current I during the main flash phase 2. Immediately before the main flash phase 2, the load current I is increased in a ramped manner to the load current intensity Imin. The control unit CTRL or the processor CPU sets the load current intensity Imin as the value of the load current I. The load current I is used as the flash current. During the entire main flash phase 2, the load current I is constant and has the load current intensity Imin. During the main flash phase 2, the subject M is then exposed for the duration of the exposure time TB by means of the image sensor CS according to the ISO setting suitable for the minimum load current intensity Imin. Alternatively or additionally, the exposure time TB, i.e. the duration of the main flash phase 2, can be varied. After the main flash phase 2, the load current I is again reduced to the value 0. The control line STR can be realized as a bus-type line. One of the control lines STR can be configured as a strobe line, via which the processor CPU transmits switch-on and switch-off signals to the control unit CTRL. The pre-flash and the main flash phases 1, 2 are initiated with the switch-on signals. The switch-off signals are used to end the pre-flash and the main flash phases 1, 2. The duration of the main flash phase 1 can be equal to or less than the exposure time TB. The processor CPU also sets an exposure time at the sensor CS. The starting time and the duration of the exposure time for the sensor CS are identical to the starting time and the duration of the exposure time TB for the main flash phase 2.

With the circuit introduced according to FIG. 1 and the method according to FIG. 2 for operating the circuit, pictures of the subject M can be achieved with the image sensor CS with a high reliability. It is especially advantageous that the operation is independent of the battery voltage VBAT within wide limits. By connecting all subsystems required or operated by the user in parallel with the taking of the photograph by means of the image sensor CS, the minimum load current intensity Imin is reduced to such an extent that it is ensured that at least a current corresponding to the minimum load current intensity Imin is available during the main flash phase 2. During the main flash phase 2, the supply voltage VBAT is greater than or equal to the threshold value Vlow. A sufficient exposure at the image sensor is ensured based on the gain ISO and/or the exposure time TB. In this manner, the load current I in accordance with the minimum load current intensity Imin is constant during the entire taking of the picture and is independent of the equivalent resistance ESR of the battery BAT. The equivalent resistance ESR may be subject to strong fluctuations depending on the charge state and temperature. An elaborate calculation can also be omitted in the operation of the circuit.

In an alternative embodiment, not shown, the control unit CTRL or the processor CPU sets a slightly lower value than the load current intensity Imin for the load current I in the main flash phase 2. The load current intensity Imin is reduced by a predetermined percentage or a predetermined value and the value obtained in this manner is set as the load current I in the main flash phase 2. Thus the safety margin is advantageously increased. This compensates for a lower efficiency of the integrated circuit, particularly the controllable power supply Iled and the voltage converter EPC, due to a heating in the main flash phase 2 as compared to the pre-flash phase 1.

In an alternative embodiment, the processor CPU sets the exposure time of the sensor CS relative to the exposure time TB of the main flash phase 2 differently.

Figure 3:
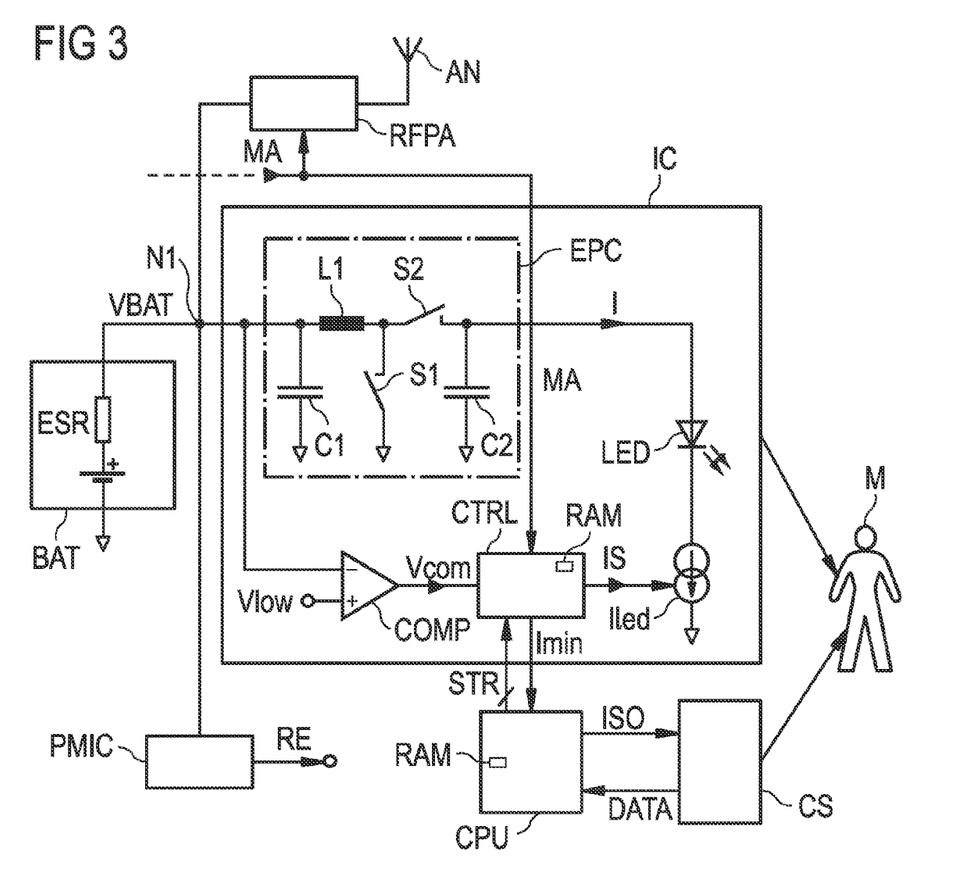
FIG. 3 shows an example of a circuit with current limitation and a priority load according to the proposed principle.

FIG. 3 shows an example of a circuit with current limitation for operating a priority load RFPA according to the proposed principle. The circuit according to FIG. 3 is another embodiment of the circuit according to FIG. 1. A priority load RFPA, which may be a communication module of a mobile telephone, for example, is shown in the drawing. The priority load RFPA is possibly connected to an antenna AN. The priority load RFPA is a high-frequency power amplifier. A transmission signal output by the high-frequency power amplifier is routed to the antenna AN. After activation by a user, the priority load RFPA is generally operated with higher priority than is taking a picture with a flash. The priority can relate, for example, to a call or the reception of a text message. The priority is signaled by means of a control signal MA to the control unit CTRL. The control signal MA can be referred to as a priority signal. This control signal MA causes the adjustment or reduction of the load current I to be interrupted for a certain time, preferably during the use of the priority application, in order to ensure that the priority application has sufficient power available. The control signal MA switches on the priority load RFPA during a period of time 13.

Figure 4:
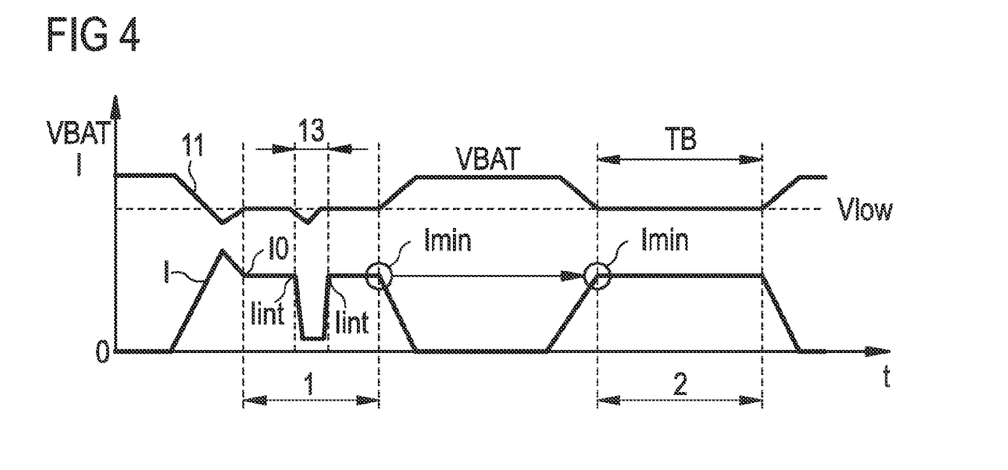
FIG. 4 shows an example of a method for current limitation and operation of a priority load according to the proposed principle.

FIG. 4 shows an example of a corresponding method for operating a priority application according to the proposed principle. The circuit shown in FIG. 3 can be operated with the method shown in FIG. 4. The pre-flash phase 1 and the main flash phase 2 are shown in a manner analogous to that in FIG. 2. In addition to the adjustment and reduction of the load current I to a minimum value Imin of the load current, an event corresponding to the switching on of the priority application is shown during the time period 13. For this event, an interim current intensity Iint is stored at the beginning of the period 13 of the event, and the necessary current intensity of the load current I is reduced during the temporal progression of the priority application, so that sufficient battery voltage VBAT is available for the priority application. The control signal MA indicates both the beginning and the end of the time period 13 for the priority event. When the event is concluded, or the priority application has been terminated, the load current I is again adjusted to the stored interim current intensity Iint and the regulation and adjustment of the load current I in the manner explained in FIG. 2 is continued.

With the aid of the control signal MA, it is possible to prevent certain subprocesses such as a priority application from leading to a critical voltage value for the battery voltage VBAT. In the aforementioned mobile terminal devices, safety settings are usually provided that stop parts of the system or the entire system at critical voltage values and switch off the device. This can be prevented with the aid of the control signal MA.

Figure 5:
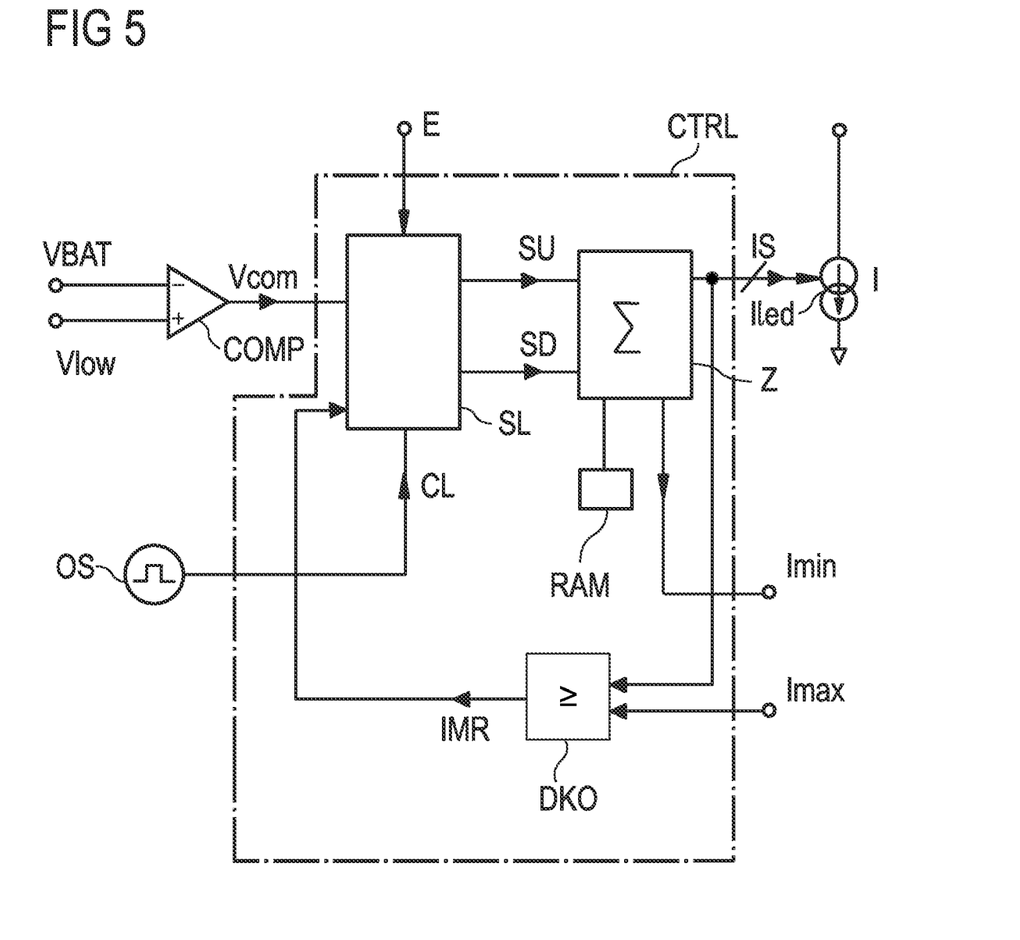
FIG. 5 shows an example of a control circuit.

FIG. 5 shows an example of a control circuit CTRL in which the integrated circuit IC shown in FIGS. 1 and 3 can be used. The control circuit CTRL comprises a counter Z. The counter Z is coupled on the input side to the comparison means COMP. On the output side, the counter Z is coupled via the control output of the control circuit CTRL to the control input of the controllable power supply Iled. The counter Z is further connected to the register RAM. The counter Z is also coupled to the processor CPU, not shown. The counter Z is realized as an up/down counter. An oscillator OS is coupled to the counter Z on the output side. The control circuit CTRL further comprises a logic circuit SL, which couples the output of the comparison means COMP and the oscillator OS to the inputs of the counter Z. The counter Z comprises an up-count input SU and a down-count input SD.

The clock signal CL of the oscillator OS, the comparison voltage Vcom and a start/stop signal E are fed to the logic circuit SL. The processor CPU provides the start/stop signal E on the control line STR. When the start/stop signal E signals the beginning of the starting phase 11, the logic circuit SL feeds the clock signal CL to the up-count input SU. The counter Z begins to count upward from the value 0. The counter Z outputs its count level as a current signal IS. The current signal IS is realized as a bus signal. The controllable current supply Iled converts the current signal IS into the load current I. The controllable current supply Iled is constructed as a digital-analog converter, which converts the control signal IS in digital form into the analog load current I. The load current I starts from the value 0. The maximum current intensity Imax is stored in the register RAM.

If the power of the battery BAT is strong, the counter Z counts up to the value of the maximum current intensity Imax. The control circuit CTRL comprises a digital comparator DKO, which compares the control signal IS to the maximum current intensity Imax. The digital comparator DKO outputs a comparator signal IMR, which is routed to the logic circuit SL. If the control signal IS is greater than or equal to the maximum current intensity Imax, the digital comparator DKO outputs the comparator signal IMR with a first logical value such as 1. If the control signal IS is less than the maximum current intensity Imax, the comparator signal IMR has a second logical value such as 0. With the aid of the digital comparator DKO, the incrementing of the counter Z and thus the run-up phase of the current signal IS and the load current I, and thus also the starting phase 11, are terminated. The maximum current intensity Imax is stored in the register RAM as the starting current intensity I0.

If the supply voltage VBAT falls below the threshold value Vlow, however, then the comparison signal Vcom causes the logic circuit SL to no longer send the clock signal CL to the up-count-input SU. The incrementation of the counter Z is thus stopped. Instead, the clock signal CL is routed to the down-count input SD. The counter Z thus reduces its counter level and therefore the current signal IS. The instantaneous current signal IS is stored in the register RAM as the starting current intensity I0. The logic circuit SL is designed so that the decrementation is slower than the incrementation. For this purpose, the logic circuit SL only routes every nth pulse of the clock signal CL to the down-count input SD for decrementation. If the supply voltage VBAT again rises above the threshold value Vlow due to the falling load current I, then the comparison signal Vcom causes the counter Z to discontinue counting down. The logic circuit SL is designed, however, in such a manner that the counter Z does not start to count back up again. Thus the starting current intensity I0 is determined at the end of the starting phase 11.

In the pre-flash phase 1, the counter Z retains its count level, which represents the starting current intensity I0, when the load LD is switched on, or lowers its count level. At the end of the pre-flash phase 1, the counter Z stores its count level, which represents the load current intensity Imin, in the register RAM. During the main flash phase 2, the current signal IS corresponds to the load current intensity Imin stored in the register.

One step in the stepwise reduction of the load current I thus corresponds to the change of the count level of counter Z by a constant predetermined value. The value can be 1. The value can also be greater than 1, however. The control unit CTRL is advantageously designed in such a manner that the increase of the load current I in the starting phase 11 is faster than the reduction of the load current I in the starting phase 11 or the pre-flash phase 1.

In an alternative embodiment, not shown, a digital-analog converter is arranged between the counter Z and the controllable power supply element. The power supply Iled is then triggered with an analog signal.

LIST OF REFERENCE CHARACTERS

1 Pre-flash phase
11 Starting phase
12 Time when a load is switched on
13 Time period
2 Main flash phase
AN Antenna
BAT Battery
C1 First capacitor
C2 Second capacitor
CL Clock signal
COMP Comparison means
CPU Processor
CS Sensor
CTRL Control unit
DATA Data line
DKO Digital comparator
E Start/stop signal
EPC Voltage converter
ESR Equivalent series resistance
I Load current
I0 Starting current intensity
IC Integrated circuit
Iint Interim current intensity
Iled Controllable power supply
Imax Maximum current intensity
Imin Load current intensity
IMR Comparator signal
IS Current signal
ISO Gain
L1 Inductor
LD Load
LED Flash means
M Subject
MA Control signal
N1 Node
OS Oscillator
PMIC Power management circuit
RAM Register
RE Reset signal
RFPA Priority load
S1 First switch
S2 Second switch
SD Down-count input
SL Logic circuit
STR Control line
SU Up-count input
VBAT Supply voltage
Vcom Comparison voltage
Vlow Threshold value
t Time
TB Exposure time
Z Counter

The invention claimed is:

1. A method for current limitation of the load current for a flash means, the method comprising:
provision of a supply voltage; and
adjusting a load current for supplying power to the flash means based on the supply voltage, by reducing the load current stepwise until the supply voltage is greater than a threshold value,
wherein the flash means is configured to operate in a pre-flash phase and a main flash phase, and
wherein the load current is increased in a ramp-like manner before the beginning of the pre-flash phase or before the beginning of the main flash phase.

2. The method according to claim 1, wherein the load current is adjusted in the pre-flash phase.

3. The method according to claim 2, further comprising:
storing the load current intensity of the adjusted load current in a register for subsequent triggering of the flash means in the main flash phase with the load current intensity stored in the register.

4. The method according to claim 2, wherein the load current increases to a starting current intensity before the beginning of the pre-flash phase, and
wherein the starting current intensity corresponds to a predetermined maximum current intensity, at which the supply voltage is greater than the threshold value, or to a resulting current intensity at which the supply voltage is still greater than the threshold value, and the load current is reduced stepwise in the pre-flash phase starting from the starting current intensity.

5. The method according to claim 2, wherein the flash means is triggered at the beginning of the pre-flash phase with the starting current intensity.

6. The method according to claim 2, wherein at least one additional load is connected stepwise to the supply voltage in the pre-flash phase, and
wherein the load current is reduced based on the additionally connected load.

7. The method according to claim 3, wherein a parameter selected from a group comprising an exposure time and a gain of a connectible sensor is adjusted based on the load current intensity stored in the register.

8. The method according to claim 1, wherein the stepwise reduction of the load current is interrupted, based on a control signal, in order to operate a priority load for the time period of the control signal.

9. The method according to claim 8, wherein, based on the control signal, the following steps take place:
storage of an interim current intensity; and resumption of the stepwise reduction of the load current, starting from the stored interim current intensity, after the time period.

10. The method according to claim 3, wherein the load current intensity stored in the register is constant during the main flash phase for triggering the flash means, unless a priority load is operated.

11. A circuit with current limitation of the load current for a flash means, the circuit comprising:
   a controllable power supply, to which a supply voltage can be fed and which, based on the supply voltage, provides a load current for supplying a connectible load;
   a comparison means, to which the supply voltage can be fed and which is designed to provide a comparison voltage, which is dependent on a comparison of the supply voltage to a threshold value;
   a control unit, which is connected to the comparison means and the controllable power supply, wherein the control unit is designed to reduce the load current by means of the controllable power supply based on the comparison voltage; and
   a register, coupled to the control unit, for storing a load current intensity of the load current,
   wherein the flash means is configured to operate in a pre-flash phase and a main flash phase, and
   wherein the load current is increased in a ramp-like manner before the beginning of the pre-flash phase or before the beginning of the main flash phase.

12. The circuit according to claim 11, wherein the comparison means is constructed as a comparator.

13. The circuit according to claim 11 or 12, wherein the controllable power supply has a current source or a current sink.

14. The circuit according to claim 11, wherein a processor can be connected to the control unit, and
   wherein the processor is designed to adjust a gain level of a sensor connectible to the processor on the basis of the load current intensity stored in the register.

15. The circuit according to claim 11, wherein the control unit is designed to control the controllable power supply based on a control signal in order to operate a priority load.

16. The circuit according to claim 15, wherein the control unit is designed to store an interim current intensity in the register and to load the interim current intensity from the register.

17. The circuit according to claim 11, further comprising a voltage converter that couples the controllable power supply to the connectible supply voltage and is connected to the comparison means.

* * * * *